Feb. 23, 1954
C. BARR
2,670,159
AMPHIBIOUS HELICOPTER LANDING GEAR
Filed Jan. 28, 1950
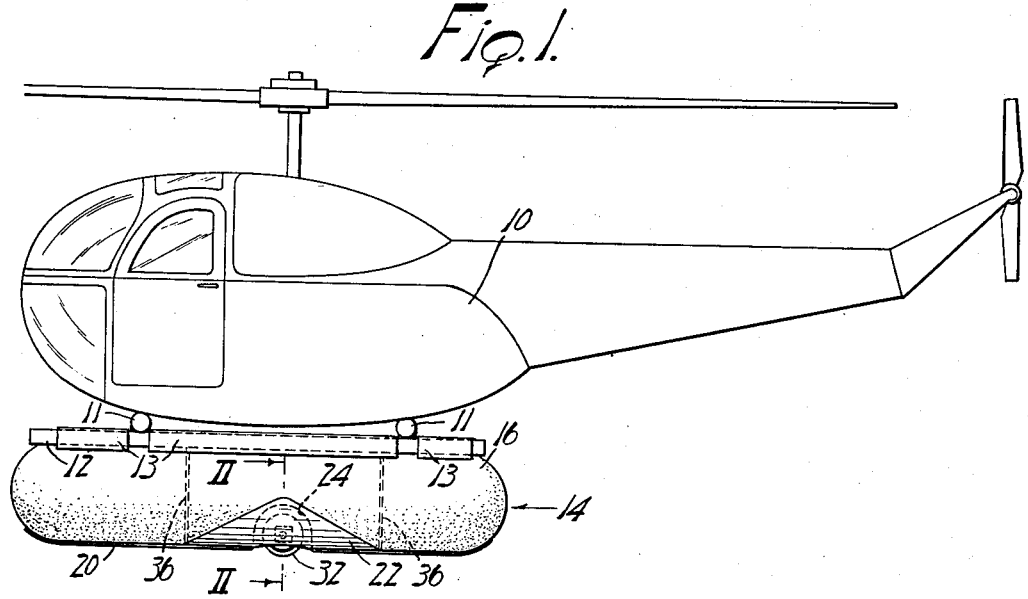
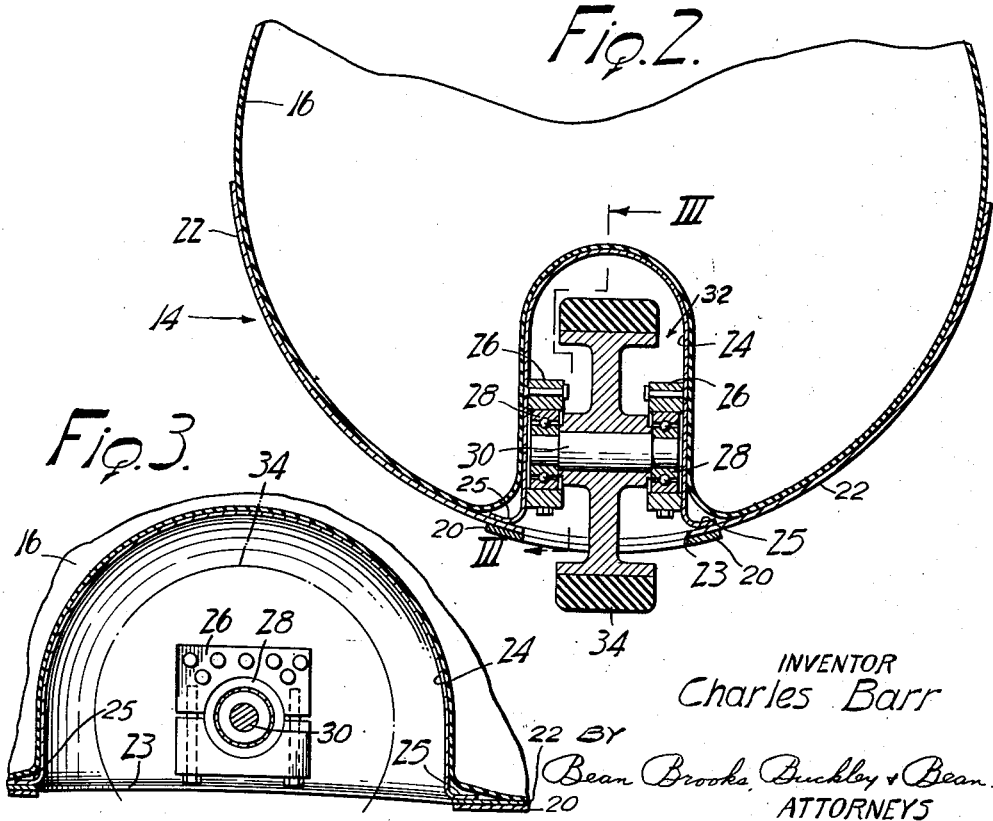
INVENTOR
Charles Barr
BY
Bean Brooks, Buckley & Bean
ATTORNEYS Patented Feb. 23, 1954

2,670,159

UNITED STATES PATENT OFFICE 2,670,159

AMPHIBIOUS HELICOPTER LANDING GEAR

Charles Barr, Buffalo, N. Y., assignor to Bell Aircraft Corporation, Buffalo, N. Y.

Application January 28, 1950, Serial No. 141,039

1 Claim. (Cl. 244—101)

This invention relates to improvements in helicopter landing gear arrangements, and more particularly to amphibious landing gear structures for rotary wing aircraft and the like.

One of the objects of the invention is to provide an improved rotary wing aircraft landing gear of the pontoon float type which provides some of the ground landing and ground handling characteristics of wheel type landing gear arrangements.

Another object of the invention is to provide an improved landing gear device for rotary wing aircraft which is equally adapted to landing on water or land.

Another object of the invention is to provide in a landing gear of the type described improved landing shock absorption features.

Another object of the invention is to provide in a landing gear of the character described means for protecting the float devices from abrasion damage when landing or handling on the ground.

Another object of the invention is to provide in a landing gear arrangement of the character described a structurally simplified and relatively inexpensive landing gear arrangement.

Another object of the invention is to provide in an amphibious type landing gear comprising combination float and wheel devices, improved arrangements for transmitting the loads between the wheels and the floats and the support structures.

Other objects and advantages of the invention will appear from the specification hereinafter.

In the drawing:

Fig. 1 is a side elevation of a helicopter aircraft equipped with a landing gear of the invention;

Fig. 2 is a fragmentary section, on an enlarged scale, taken along line II—II of Fig. 1; and Fig. 3 is a fragmentary section, taken along line III—III of Fig. 2.

The drawing illustrates the invention in conjunction with a helicopter type aircraft comprising generally a body 10 having strut devices 11 extending laterally therefrom at opposite sides of the body 10 for mounting therebelow the undercarriage elements. At opposite ends of the struts 11 they carry paired longitudinally extending longerons or body struts 12 between which the float units of the invention are mounted by means of straps or the like as indicated at 13. The amphibious landing gear device of the invention comprises a wheeled float unit such as is designated generally at 14; and it is to be understood that one or more of such float units may be employed in the case of each aircraft and attached to the longerons 12 in any preferred manner so as to provide therebelow the desired aircraft support. However, as is rather conventional in the art, the undercarriage structure will usually comprise a pair of such float units 14 arranged to extend longitudinally in parallel transversely spaced relation and in line with the longitudinal axis of the aircraft, so as to provide a broad base support for the aircraft when resting thereon.

Each of the float units 14 comprises a pneumatic float cell 16 which as shown in the drawings may be of generally cigar shape or a modification thereof, and is formed of a flexible fabrication such as nylon cloth or the like treated as by vulcanized neoprene or rubber or other suitable material to render it water-tight and air-tight under the pressures encountered during landing operations. Thus, the air filled cell 16 will be provided of such dimensions as to furnish the required buoyancy for supporting the aircraft when landing upon water surfaces. The straps 13 may be formed of similar fabric and vulcanized or otherwise fixed to the cell material, as preferred.

Along its under surface and longitudinally thereof each cell 16 is provided with a metal skid plate 20 which provides an abrasion resistance shield to protect the cell 16 against scuffing during ground landings or ground taxiing or other handling operations. Intermediately of the ends of the cell 16, the skid plate 20 is supplemented by means of a saddle plate 22 which is formed of metal sheet stock to partially encircle the bottom and sides of the cell 16 at mid-portion thereof in the region of the longitudinal station of the center of gravity of the entire aircraft. The saddle 22 is preferably rigidly attached to the skid 20 as by means of welding or the like, and the skid-saddle unit is apertured as indicated at 23 and fitted thereat with a wheel well 24 formed of sheet metal and welded or otherwise suitably attached along its bottom flanged edge portion 25 to the saddle 22 so as to enclose the aperture 23 of the saddle member.

The wheel well member 24 mounts interiorly thereof and at opposite sides thereof split bearing blocks 26—26 into which are fitted ball bearings 28 which in turn rotatably mount the opposite ends of an axle 30 carrying a landing wheel 32. As indicated at 34, the wheel 32 may be fitted with a rubber tire of any preferred form, but it is a particular feature of the present invention that the wheel tire need not be of the pneumatic type in order to provide landing shock absorption characteristics, in view of other features of the invention which will be hereinafter described.

The cell 16 is cemented or otherwise suitably attached as by means of riveted tabs or the like to the skid member 20; to the inner surface of the saddle 22; and to the outer surface of the wheel well 24, whereby the skid-wheel unit is suspended from the cell during flight and is carried thereby so as to be contacted first by the ground under ground landing conditions. Thus, upon landing, the skid-wheel units first contact the ground and the landing shock is then absorbed by the cells 16 which function in the manner of elastic interconnections between the body longerons 12 and the ground contacting portions of the undercarriage. In event the aircraft is moving forwardly or rearwardly incidental to the landing, the wheels 32 operate to accommodate such movement while the skids 20 prevent scuffing or abrasion damage to the cells 16. Similarly, subsequent to a ground landing operation the aircraft may be taxiied or trundled as in connection with the usual ground handling maneuvers; such movements of the aircraft being facilitated by the wheels 32 and the skids 20.

Thus, it will be appreciated that the landing gear of the invention possesses novel features which enable it to provide ground handling characteristics closely similar to those of conventional ground landing gear arrangements. At the same time, the cells 16 are adapted to function efficiently as floats for supporting the aircraft in connection with water landing operations; the elasticity of the cells again operating in such case to cushion water landing shocks, while the substantially retracted wheel and skid units of the gear provide no appreciable interference with optimum functioning of the cells in connection with water landings and taxiing. It is a particular feature of the invention that the saddle member 22 is arranged to be of sufficient area in contact with the cell as to provide satisfactory transmission of the load support forces through the cell and into the skid-wheel unit. Also, the smoothly molded form of the wheel well member 24 operates to distribute the load from the cell to the skid wheel unit in even manner. The wheel carrying bearings 26 are rigidly attached to the sheet metal structure of the wheel well, whereby the wheel is at all time positionally maintained in proper manner while the split bearing construction allows for easy replacement of the wheel.

Preferably, as illustrated at Fig. 1, the cell 16 is subdivided by partition devices 36 so as to provide a pontoon 16 of multi-cell form, whereby the sub-cell portion which rests upon the saddle 22 may readily be maintained under whatever pneumatic pressure may be necessary for proper support of the aircraft through means of the saddle device, without requiring similar high pressure conditions to be maintained in the other sub-cell portions of the float.

Although only one form of the invention has been shown and described in detail, it will be apparent to those skilled in the art that the invention is not so limited but that various changes may be made therein without departing from the spirit of the invention or the scope of the appended claim.

I claim:

An amphibious landing gear for air craft comprising a hollow buoyant cell formed of flexible airtight waterproof sheet material, said cell being of greater length than diameter and having a lower portion arcuate transversely and provided midway its length and width with a portion extending upwardly into the cell and constituting a pocket having a top wall and opposite end walls and side walls and being open along its bottom its full length and width, a saddle formed of stiff sheet material of appreciably greater length and width than said pocket arcuate transversely to conform to the transversely arcuate under portion of said cell and tapered towards opposite ends, said saddle being firmly mounted in close contacting face to face engagement with the outer surfaces of the said under portion of the cell and midway its length and width having an opening registering with the open bottom of the pocket and projecting from the end walls and side walls of the pocket, a wheel-well of stiff sheet material fitting snugly within the pocket and being open along its bottom and having side and end walls the lower edge portions of which are flared outwardly and provide bordering flanges supported upon and secured to upper surfaces of portions of the saddle along the sides and ends of the opening therein, a skid strip mounted against the outer surface of said saddle and extending longitudinally thereof with portions projecting from the ends thereof and extending along the cell to the ends thereof, said skid strip having an opening registering with the opening in said saddle, bearings in said well carried by side walls thereof, and a wheel rotatably mounted between said bearings and having its lower portion protruding downwardly through the registering openings in the saddle and the skid strip.

CHARLES BARR.

References Cited in the file of this patent

UNITED STATES PATENTS

| Number | Name | Date |
| --- | --- | --- |
| 1,148,340 | Sloper | July 27, 1915 |
| 1,317,741 | Turnbull | Oct. 7, 1919 |
| 1,601,012 | Von Waldy | Sept. 28, 1926 |
| 2,150,420 | Cooper | Mar. 14, 1939 |
| 2,375,973 | Cooper et al. | May 15, 1945 |
| 2,494,445 | Moeller | Jan. 10, 1950 |